United States Patent

[11] 3,610,262

[72] Inventor William H. Wise
 Bellevue, Wash.
[21] Appl. No. 864,449
[22] Filed Oct. 7, 1969
[45] Patented Oct. 5, 1971
[73] Assignee The Boeing Company
 Seattle, Wash.

[54] STOWABLE VANE SONIC THROAT INLET FOR JET AIRCRAFT NOISE SUPPRESSION
 5 Claims, 13 Drawing Figs.

[52] U.S. Cl. .................................................. 137/15.1,
 181/33.21
[51] Int. Cl. ...........................................F02b 27/00,
 F02k 11/00
[50] Field of Search........................................ 137/15.1,
 15.2; 181/33.21

[56] References Cited
 FOREIGN PATENTS
 921,127 3/1963 Great Britain................ 181/33.21

Primary Examiner—Alan Cohan
Attorneys—Glenn Orlob and Robert B. Hughes

ABSTRACT: An apparatus to suppress fan or compressor noise emitted in a forward direction from the inlet of an airplane jet engine, particularly for approach mode operation of the airplane. There are in the engine inlet at a location forward of the compressor a set of vanes which are swing mounted in the inlet cowl wall. For low engine thrust values, the vanes are swung to a position where they extend radially inwardly in a plane generally transverse to the centerline axis of the inlet to provide a flow restriction in the inlet. This causes the air in the inlet to flow at, or nearly at, sonic velocity in the region of the vanes. For moderately high thrust settings and engine speeds where greater airflow through the inlet is required, the vanes are swung rearwardly to an angle which provides greater effective flow area through the inlet and maintains Mach 1.0 flow velocity in the vane region to achieve high noise attenuation. During airplane cruise operation, the vanes are swung into the inlet wall to provide a substantially settings engine inlet.

PATENTED OCT 5 1971

INVENTOR:
WILLIAM H. WISE
BY
Robert B. Hughes
ATTORNEYS

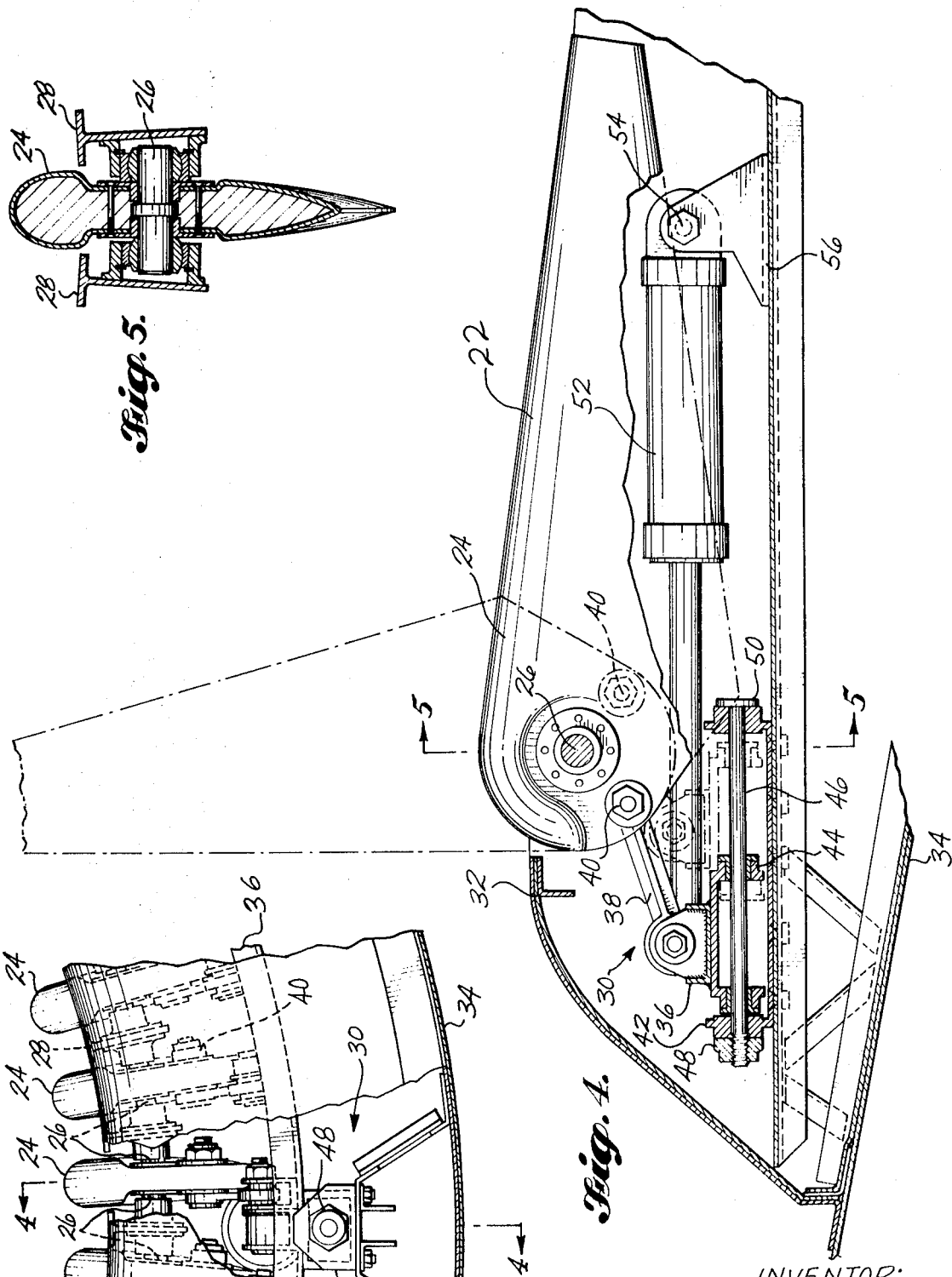

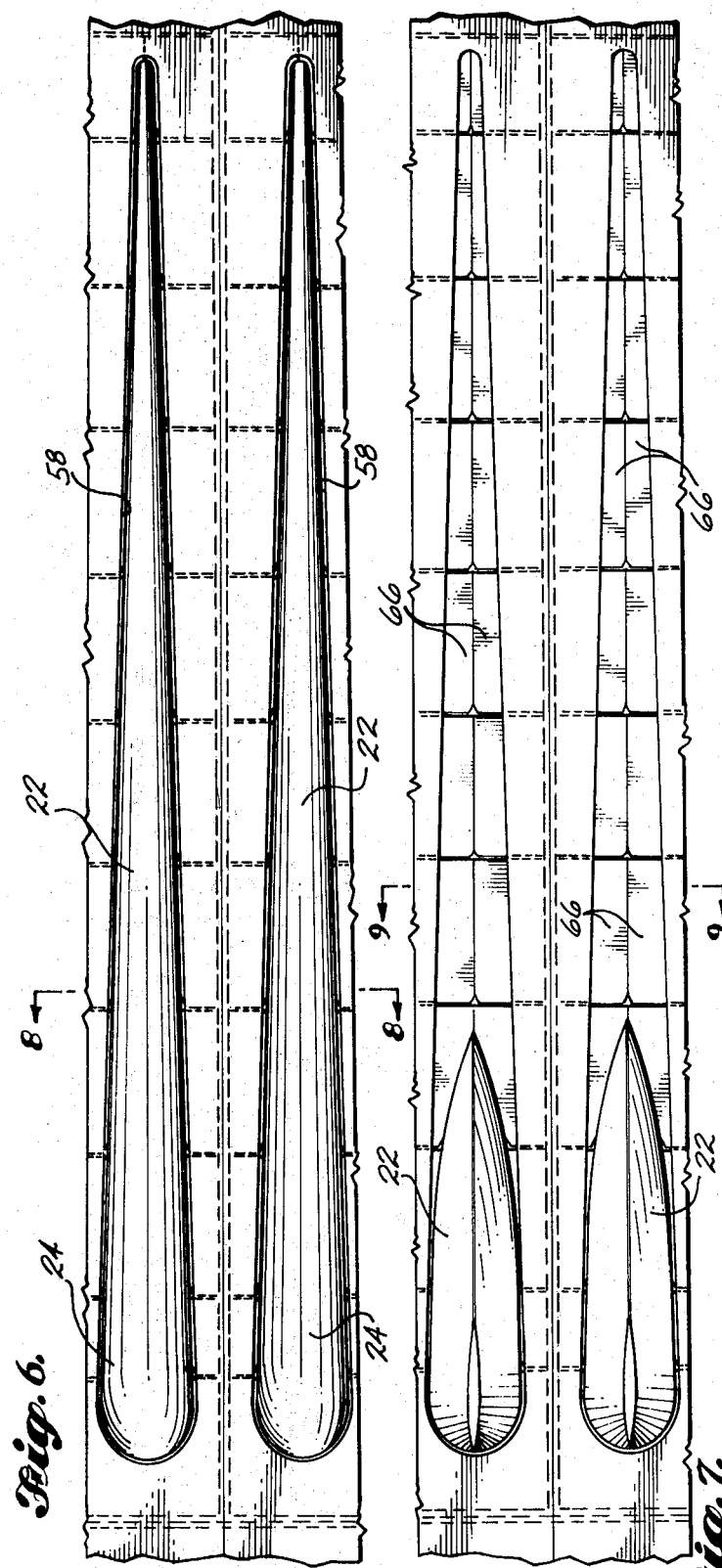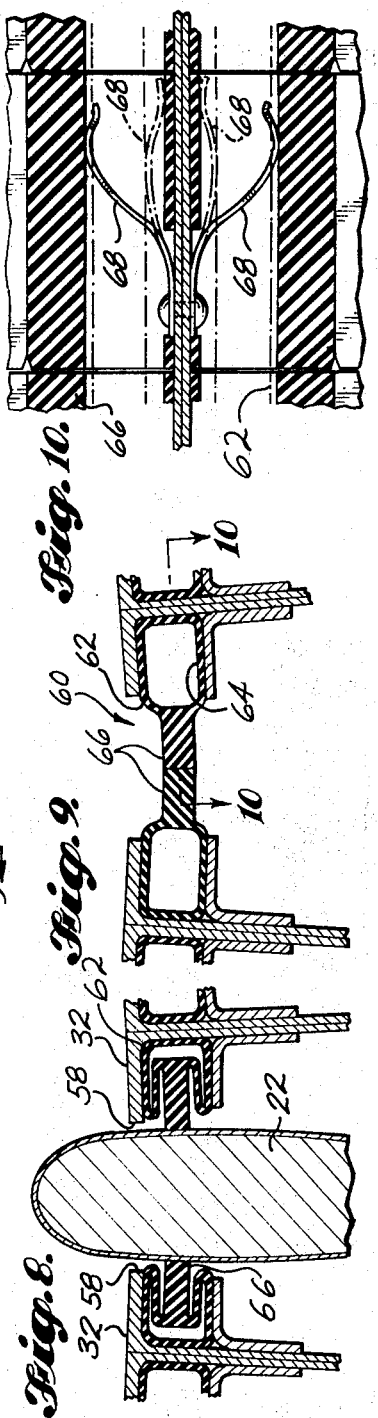

INVENTOR:
WILLIAM H. WISE
BY
Robert B. Hughes
ATTORNEYS

STOWABLE VANE SONIC THROAT INLET FOR JET AIRCRAFT NOISE SUPPRESSION

BACKGROUND OF THE INVENTION

1. Field of the Invention

This invention relates to the suppression of noise emitted forwardly from the fan or compressor section of a jet engine, particularly as applied to turbofan engines for aircraft propulsion.

2. Description of the Prior Art

One way to attenuate the noise emitted forwardly from the fan or compressor section of a jet engine is to control the flow of air through the engine inlet in such a manner that the air reaches a velocity that is equal or near the speed of sound, forming a barrier to the noise. To accomplish this, it is necessary to restrict the flow area through the inlet (i.e., choke the inlet) when the engine is operating at a low power setting and air intake is less, as, for example, during airplane operation at approach mode. On the other hand, for higher engine power requirements, such as during takeoff and cruise, the flow area through the inlet should not be restricted.

One way this is accomplished in the prior art is to vary the contour or position of the inlet wall so as to change the inlet area. Another prior art approach is to vary the size and/or location of the center body of the inlet to accomplish the desired inlet flow area variation. The problems associated with such a sonic throat inlet are to provide an apparatus which is light, compact and relatively uncomplicated, and yet to arrange the inlet so that the airflow therethrough poses only minumum losses in engine performance in its various operating conditions.

SUMMARY OF THE INVENTION

In the present invention there are a plurality of vanes which are each swing mounted in the inlet of a jet engine about an axis having a substantial vector component generally perpendicular to the lengthwise axis of the vane and lying in a plane generally transverse to the longitudinal center axis of the inlet. For cruise mode of the airplane engine, the vanes are retracted into the inlet wall. For lower engine power settings, the vanes are swung out into the inlet so as to provide a restricted flow area in the inlet. By varying the angle of the lengthwise axis of the vanes in the inlet, the flow area through the vane region becomes more or less restricted to maintain choked flow in the inlet.

It is a general object of the present invention to provide an improved apparatus and method for noise attenuation. It is a more specific object of the present invention to provide an apparatus and method for high inlet noise attenuation in a jet engine during approach mode operation by controlling airflow area in the engine inlet while incorporating the desirable features, such as minimum penalties in engine performance, weight, complexity and size of apparatus.

DESCRIPTION OF THE DRAWINGS

FIG. 3 is a front elevational view similar to that of FIG. 1, detailing the lower center portion of the apparatus shown in FIG. 1, with portions of the inlet wall broken away;

FIG. 4 is a longitudinal sectional view taken along line 4—4 of FIG. 3;

FIG. 5 is a transverse sectional view taken along line 5—5 of FIG. 4;

FIG. 6 is a longitudinal view of a pair of vanes of the present invention shown in their fully retracted position, looking radially outward from the center axis of the engine inlet;

FIG. 7 is a view similar to FIG. 6, but with the vanes extended to their minimum flow area position;

FIG. 8 is a transverse sectional view taken along line 8—8 of FIG. 6;

FIG. 9 is a transverse sectional view taken along line 9—9 of FIG. 7;

FIG. 10 is a sectional view taken along line 10'10 of FIG. 9;

DESCRIPTION OF THE PREFERRED EMBODIMENT

Figure 1:
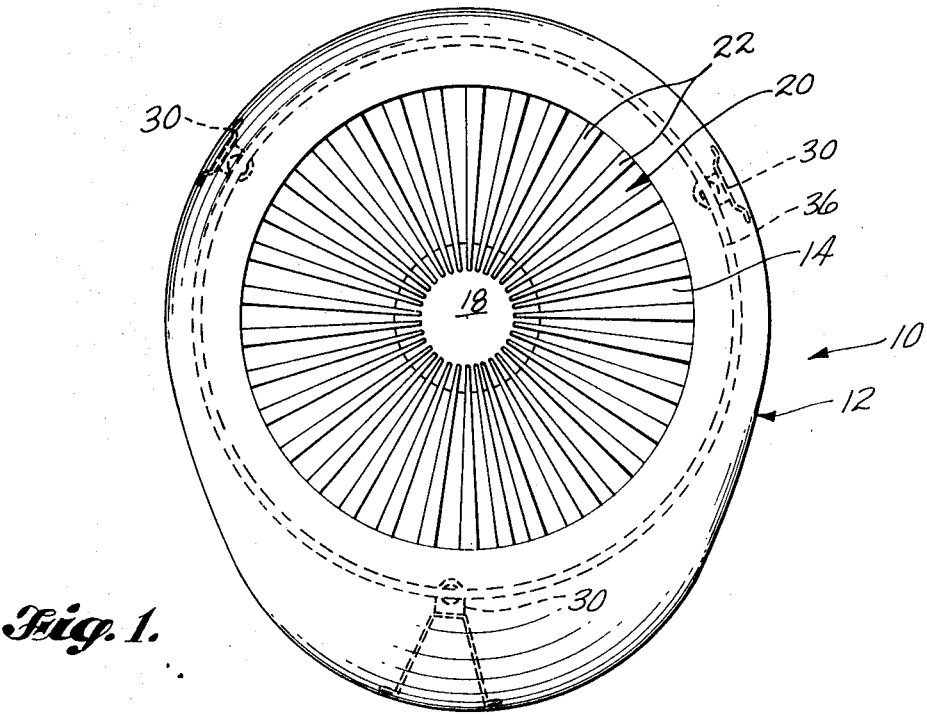
FIG. 1 is a front view of the inlet of a jet engine with the choking vanes of the present invention in their minimum flow area position.

In FIG. 1 there is shown the forward portion of an airplane jet engine 10 having an inlet 12 defining a forwardly facing air intake opening 14 through which air flows to the engine compressor shown somewhat schematically at 16. At the longitudinal center axis of the engine 10 is the hub or center body 18 of the engine compressor 16.

Positioned in the inlet 12 at a location forward of the compressor 16 is a vane assembly 20 comprising a plurality of individual inlet choking vanes 22 which in their choked position extend from the inlet wall radially inward toward the longitudinal center axis of the engine inlet 12. Each of the individual vanes 22 is aerodynamically contoured to minimize drag with respect to air flowing through the inlet opening 14 in a direction generally parallel to the longitudinal center axis of the inlet 12.

Each of the vanes 22 is swing mounted by its radially outermost root end 24 in a respective bearing 26 mounted in suitable support structure 28 in the engine inlet 12. The root ends 24 of the vanes 22 along with their respective bearings 26 are arranged in a circular array about the circumference of the forward part of the inlet 12. The axis of rotation of each of the vanes 22 is transverse to the longitudinal center axis of the inlet 12 and generally tangent to the circumference of the forward portion of the inlet 12.

The actuating mechanism for the vanes 22 is generally designated 30 and is located between the inner and outer inlet walls 32 and 34, respectively. This mechanism 30 comprises an annular channel member or ring 36 to which are connected a plurality of actuating rods 38, each of which is pivotally connected to a respective vane 22 at a location 40 spaced from the pivot axis of the vane 22 at the bearing 26. The ring 36 is slide mounted for fore and aft motion on three slide assemblies 42 arranged symmetrically about the circumference of the engine inlet 12. Each slide assembly 42 comprises a slide block 44 mounted to a longitudinal rod 46 supported at each end as at 48 and 50. To move the ring 36 fore and aft, there is provided three actuators 52 spaced symmetrically about the circumference of the forward part of the inlet 12. By extending the actuators 12, the ring 36 is caused to move forward, and thus swing the vanes 22 rearwardly to a retracted position shown in full lines of FIG. 4. When the actuators 52 are retracted, they cause the ring 36 to move rearwardly and thus the vanes 22 to swing outwardly to their extended position where they are positioned transverse to the center axis of the engine inlet 12 so as to extend radially inward (as shown in the broken lines of FIG. 4). The aft end of each of the hydraulic actuators 52 is connected as at 54 to suitable support structure 56 in the engine inlet 12.

To accommodate the vanes 22 in their retracted position, the inner inlet wall 32 is formed with a plurality of longitudinal slots 58. Each slot is provided with a suitable seal, such as the one shown at 60 in FIGS. 8, 9, and 10. Each seal 60 comprises two inflatable tubular members 62 positioned in respective opposed channel members 64 located on opposite sides of its respective slot 58. Extending laterally from each tubular member 62 into the slot 58 is a sealing flange 66. The tubular members 62 can be pressurized from a suitable source, such as bleed air from one of the compressor stages. As a complement (or alternate) to the pressurizing of the tubular members 62, each member 62 could be provided with one or more spring members 68 (shown in FIG. 10) which urge the tubular member 62 to their expanded position where the opposed sealing flanges 56 come into contact with one another.

As illustrated in FIG. 6 and FIG. 8, when the vanes 22 are in their retracted position, the sealing flanges 66 are pushed apart to compress the tubular members 62, with the sealing flanges 66 and the respective vanes 22 closing the slot 58. As the vanes 22 are moved to their extended position, the sealing flanges 66 close behind the trailing edges 70 of the vanes 22 to close each of the slots 58 (as shown in FIGS. 7 and 9).

Figure 11:
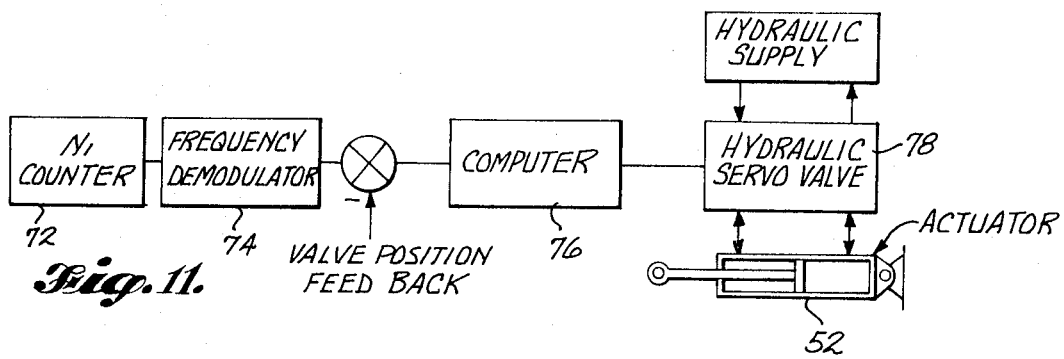
FIG. 11 is a schematic drawing of a control apparatus of the present invention.
Figure 12:
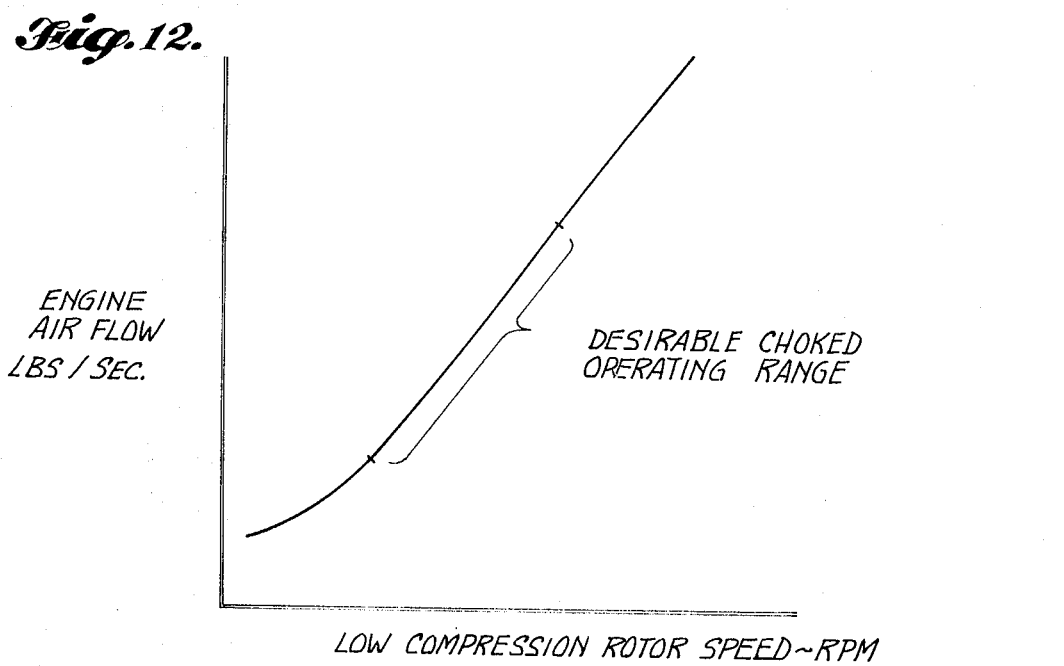
FIG. 12 is a graph plotting airflow into the inlet (and engine) against the rotational speed of the low compression rotor of the engine.

The control mechanism of the present invention is illustrated in FIG. 11, wherein there is a counter 72 which measures the speed of rotation (r.p.m.'s) of the compressor 16. The output of the counter 72 is fed through a frequency demodulator 74 through a computer 76 which produces a value corresponding to the desired mass flow through the inlet 12 relative to the compressor speed. (The relationship of compressor speed to inlet airflow is shown in FIG. 12.) This in turn actuates a hydraulic servo valve 78 which causes the aforementioned actuators 52 to translate the actuating ring 36 either fore or after to, respectively, either retract or extend the vanes 22.

Figure 2:
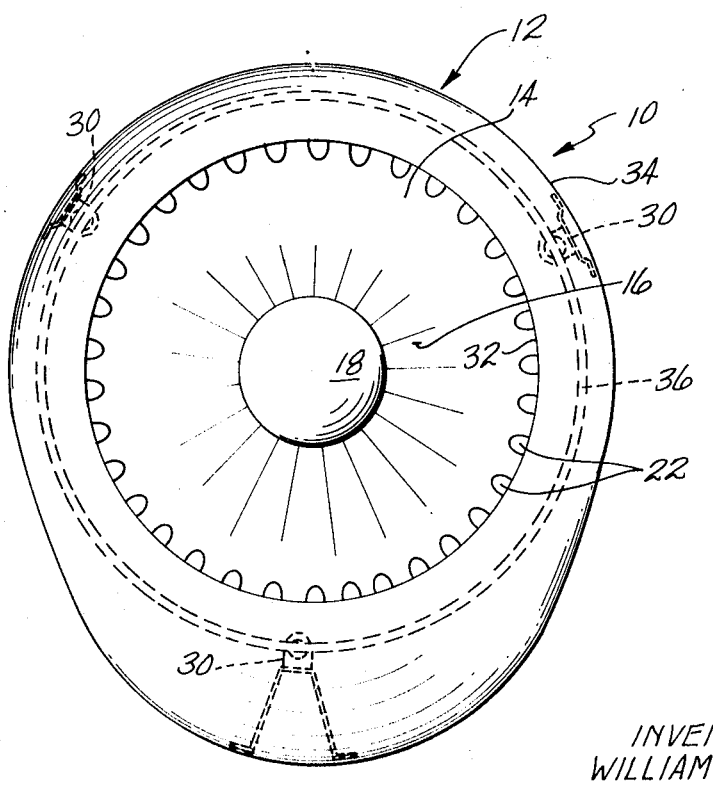
FIG. 2 is a view similar to FIG. 1, but with the choking vanes in their fully retracted, or stowed, position.

To described the operation of the present invention, let it be assumed that the airplane on which the jet engine 10 is mounted is in the cruise mode, where the engine 10 is operating at a high power setting, and the compressor 16 is operating at high capacity (at high rotational speed) and causing a high mass flow into the inlet 12. In this condition, the vanes 22 will be in the position shown in FIG. 2 and also shown in the full lines of FIG. 4, wherein the vanes 22 are retracted into the wall of the inlet 12. In this position of the vanes 22, the inlet opening 14 is substantially unobstructed to permit a large mass flow into the engine in accordance with the demands of the compressor 16.

When the aircraft enters approach mode and the power setting of the engine 10 is reduced, the rotational speed of the compressor 16 is lowered and the compressor demands less mass flow through the inlet 12. At this time the control apparatus shown in FIG. 11 is activated. As the compressor speed is reduced, the counter 72 transmits this information to the computer 76 which signals the servovalve 78 to cause the actuators 52 to retract. This in turn causes the actuating ring 36 to move rearwardly and move the vanes 22 in unison from their retracted position toward the extended position (shown in FIG. 1 and in broken lines of FIG. 4). By extending the vanes 22 into the inlet opening 14, the flow area in the region of the vanes 22 is thereby reduced so that the air passing by the vanes 22 is locally accelerated.

As the power setting of the engine 10 decreases, the rotational speed of the compressor 16 declines, less airflow is required, and the control mechanism causes the vanes 22 to extend further into the inlet. When the engine is at or below the power setting for minimum choked flow operation, the vanes 22 are in their fully extended, minimum flow area position (as shown in FIG. 1 and the broken lines of FIG. 4).

As the power setting of the engine 10 is raised, the compressor speed increases, and the counter 72 transmits this information to the computer 76 which in turn causes the actuator 52 to drive the vanes 22 to swing rearwardly. The greater the engine airflow requirement, the further rearwardly will the vanes 22 be swung so that the effective inlet flow area is maintained at the desired value to coincide with sonic airflow velocity.

Figure 13:
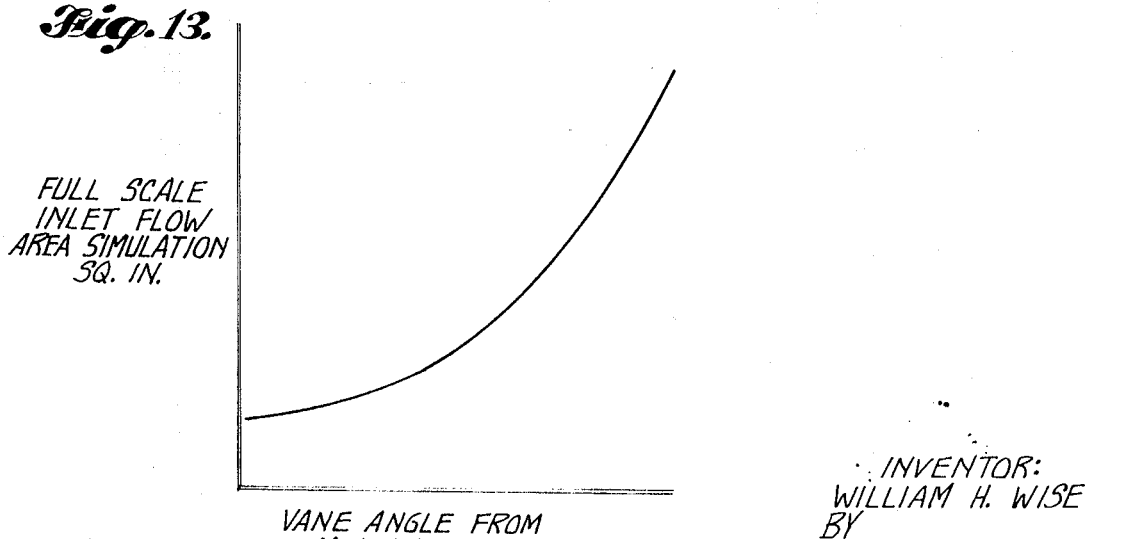
FIG. 13 is a graph indicating the effective inlet flow area relationship as a function of the angle of the vanes to the transverse axis of the inlet.

For a proper understanding of the present invention, it should be indicated that the operation of the vanes 22 in choking the airflow through the inlet 12 is not a direct function of the cosine of the angle which the lengthwise axis of each vane 22 makes with the longitudinal center axis of the inlet 12. (Another way of expressing this is that the airflow blockage is not directly proportional to the "daylight blockage area" of the vanes 22, which is that proportion of inlet area which is blocked with respect to a view from a vantage point looking directly into the inlet 12). To explain this further, let it be assumed that the vanes 22 have moved one-third of the way toward a retracted position where the lengthwise axis of the vanes 22 makes an angle of 30° with the transverse axis of the inlet 12. With the vanes in this position, if we pass a plane across the inlet 12 at the location of the roots 24 of the vanes 22, the air at the location of that plane is being obstructed only by the root portions 24 of the vanes 22 and not by the tip portions thereof. Then if we pass a plane across the inlet 12 at the location of the tips of the vanes 22, the air at the location of that plane is being obstructed only by the tip portions of the vanes 22 and not by the root portions 24 thereof. Thus, with the vanes 22 at an angle to the transverse axis of the inlet, the blockage effect of the root portions 24 of the vanes is not additive to the blockage effect of the tip portions of the vanes 22. This relationship is illustrated in the graph of FIG. 13, which shows the effective flow area of the inlet as a function of $\theta$ which is the angle of the maximum thickness line of the vanes 22 with the transverse axis of the inlet 12.

The effective flow area of the inlet may be approximated with reasonable accuracy using the following relationship:

$A_{flow} = A_{total} - A_{blockage}$ where $A_{total} = \pi f^2 + (\pi (R_{th})^2 / \cos \theta) - \pi f d$ and $A_{blockage} = K - A[(1/\cos \theta) - 1]r$ whereby $A$ = depth of vane pivot point into cowl wall
$K$ = maximum projected area blockage of all vanes (constant)
$R_{th}$ = throat radius of unrestricted inlet
$r$ = ratio of blockage to total perimeter at cowl wall
$\theta$ = angle of the maximum thickness line of the vanes to the transverse axis of the inlet
$d$ = length of projection of maximum thickness line from the vane tip to its intersection at the inlet centerline at the angle
$f$ = radial distance from the inlet centerline to maximum thickness line at the vane tip $A$, $K$, $R_{th}$ and $r$ are fixed by the design, whereas $d$ and $f$ and the effective flow area ($A_{flow}$) vary with angle $\theta$. The above relationship is valid to obtain values for the flow area curve of FIG. 13.

It should be noted that at the root portions 24 of the vanes 22 the ratio of the thickness of the vane 22 relative to its chord length is greater than that of the tip portion of the vanes 22. (These relative dimensions are illustrated in FIG. 7.) The reasons for this follow. During partially retracted operation the approaching air velocity near the center portion of the inlet is greater than that of the approaching air closer to the cowl wall. Thus, the cross section of the vanes 22 near the tips should be similar to that of a thin symmetrical transonic airfoil. However, the root portion can have greater thickness, relative to chord length, because the approaching air velocity at that radial location is lower. This is because the percentage flow blockage at the root section 24 is less affected by vane sweep angle. It is also desirable to have the chord length as short as possible to make retraction and stowing of the vanes 22 easier. An important design consideration is that the vane taper ratio be such that the vane edges lie on or near radial lines when viewed in minimum flow area position as in FIG. 1.

Now, therefore, I claim:

1. In an air inlet for an air breathing engine wherein said inlet has an inlet wall defining an inlet opening which has a longitudinal axis along which air flows through said opening, an apparatus for controlling air flow through said opening comprising:

a plurality of tapered vanes each rotatably mounted about an axis of rotation for movement from stowed positions along said wall to minimum flow area positions wherein said tapered vanes are substantially angularly displaced from said wall, each of said tapered vanes comprising symmetrically disposed oppositely facing exterior surfaces defining the cross sections of an airfoil member which has a uniform taper in thickness from a minimum at the end of the vane farthest from said axis of rotation to a maximum near the end closest to said axis of rotation, said uniform taper in thickness being such that when said vanes are disposed in said minimum flow area positions, each of the vane edges established by the points of maximum thickness of said cross sections lie substantially along planes passing through said longitudinal axis.

2. The apparatus of claim 1 which includes means for automatically and continuously moving said vanes to selected angular positions between said stowed positions and said minimum flow area positions to continuously change the effective shape and flow area of said passageway to maintain choked flow for sound suppression purposes while supplying the changing airflow requirements of said engine.

3. The apparatus defined in claim 1 wherein each of the tapered vanes at the end of the vane farthest from said axis of rotation has a cross section with the thickness to chord ratio of a thin transonic airfoil section.

4. The apparatus defined in claim 3 wherein the chord length of the cross sections of each of said vanes increases uniformly from a minimum at said end of the vane farthest from said axis of rotation to a maximum near the other end of said vane.

5. The apparatus of claim 2 wherein said means for automatically and continuously moving said vanes comprises:
 a counter means to measure the speed of revolution of a compressor rotor of said engine, and a hydraulic servovalve responsive to a signal influenced by said counter means for controlling the position of a hydraulic actuator operably connected to said vanes.